C. CRON & R. L. DINGLE.
CAR BRAKE.
APPLICATION FILED APR. 26, 1916.
1,222,935.
Patented Apr. 17, 1917.
2 SHEETS—SHEET 1.
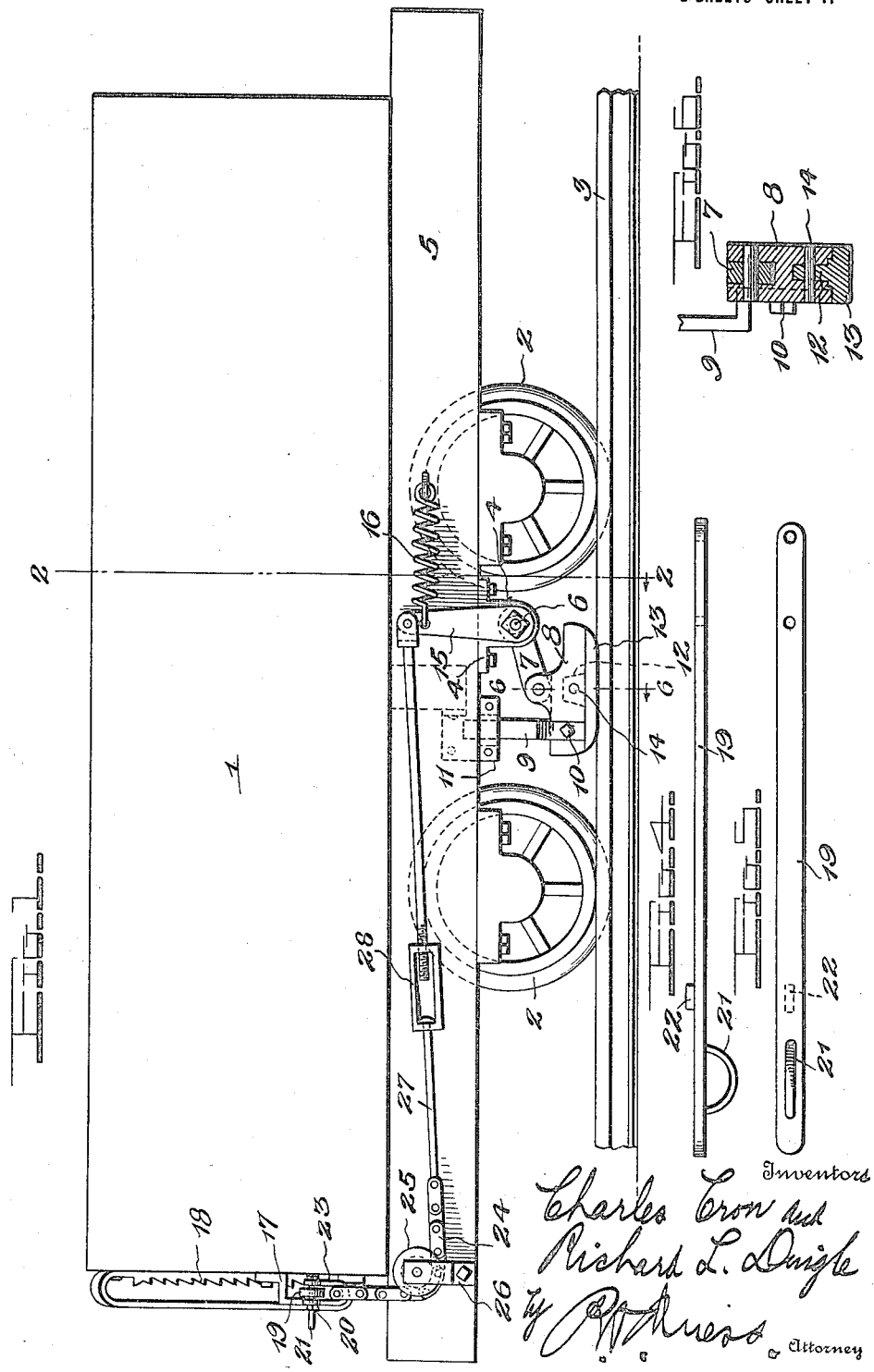

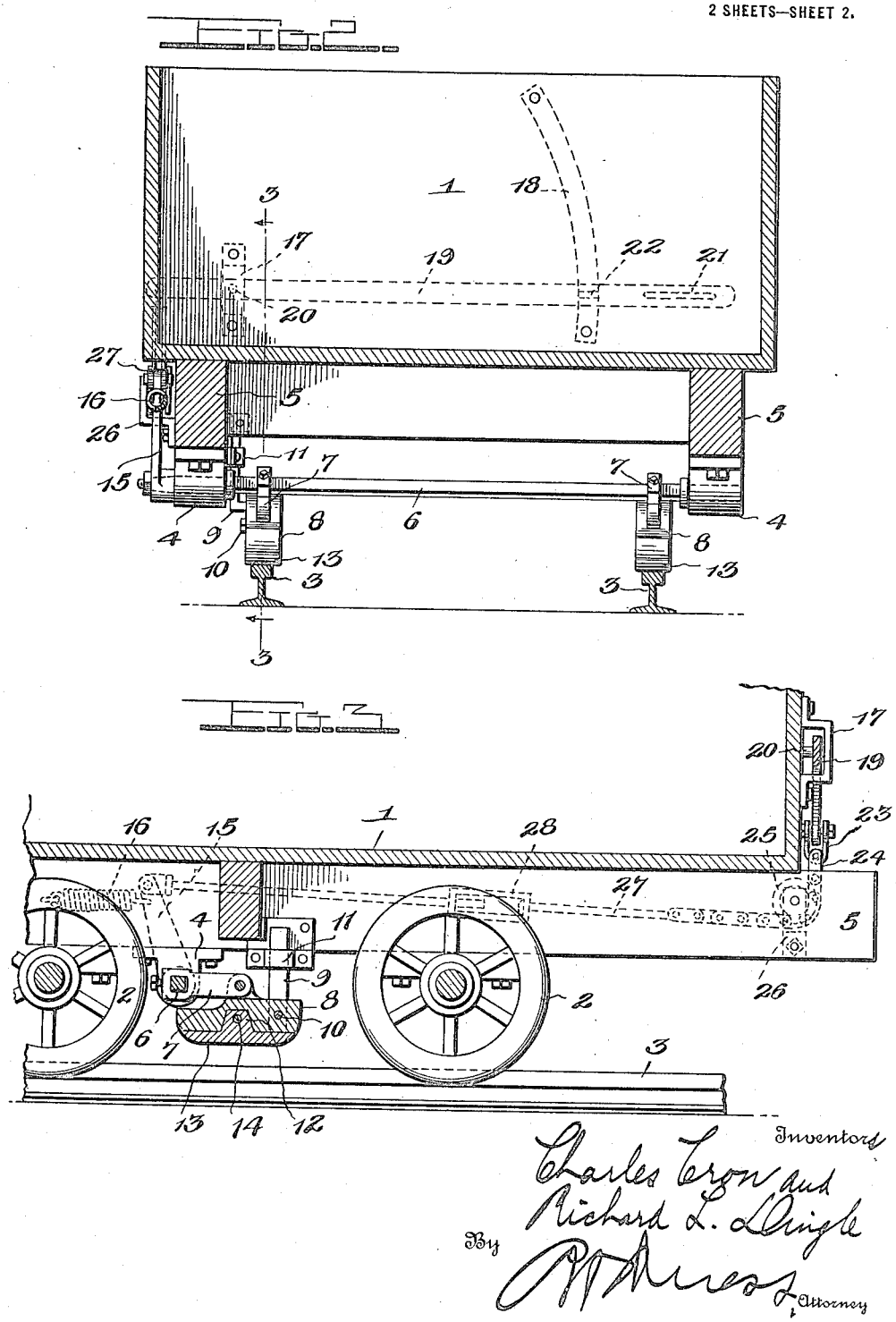

UNITED STATES PATENT OFFICE.

CHARLES CRON AND RICHARD L. DINGLE, OF WILKES-BARRE, PENNSYLVANIA.

CAR-BRAKE.

1,222,935.   Specification of Letters Patent.   Patented Apr. 17, 1917.

Application filed April 26, 1916. Serial No. 93,691.

*To all whom it may concern:*

Be it known that we, CHARLES CRON and RICHARD L. DINGLE, citizens of the United States, residing at Wilkes-Barre, in the county of Luzerne and State of Pennsylvania, have invented certain new and useful Improvements in Car-Brakes, of which the following is a specification.

This invention relates to certain new and useful improvements in car brakes and more especially to those particularly adapted for mine cars in which the brake shoe engages the rails instead of the periphery of a wheel or wheels.

The invention aims to provide a brake of the above type which will operate efficiently, be durable and simple in construction, and avoid the use of sprags and hand blocks.

The invention further resides in the features of construction and arrangements of parts hereinafter described in detail and claimed in a succinct manner, the preferred embodiment of the invention being illustrated in the accompanying drawings wherein—

Figure 1 is a side elevation of the improved brake applied to a car;

Fig. 2 is a vertical section on line 2—2 of Fig. 1;

Fig. 3 is a fragmentary longitudinal section on line 3—3 of Fig. 2;

Figs. 4 and 5 are edge and front elevations, respectively, of the brake operating lever; and Fig. 6 is a detailed section of the brake shoe taken on line 6—6 of Fig. 1.

Referring to corresponding parts by like reference numerals, 1 designates a mine car body of an approved construction having the usual wheels 2 supported upon the track rails 3.

Extending transversely beneath the car body and journaled in bearings 4, secured to the frame members 5 of the car, is a rock shaft 6 to which is adjustably and removably fixed a pair of arms 7 one of the arms being disposed over each rail.

Pivotally carried by each arm is a brake shoe carrier or block 8, one side face of which is grooved to receive a guiding bar 9, the latter being fixed to the block by bolt 10 and having its opposite end slidable in the guide bracket 11 fixed to the car beam 5. The bottom face of the block has a recess or seat for receiving the upstanding tongue 12 of brake shoe 13, a bolt 14 serving to hold the shoe to its carrier.

Thus, as the rock shaft is rotated for applying or releasing the brake, the active face of the brake shoe will remain substantially parallel with the rail this being effected by the guide bar 9 and guide bracket 11.

The rock shaft extends at one end from a bearing 4 and to this projecting end is fixed a lever arm 15 which extends upwardly alongside the adjacent car beam 5. A coiled spring 16 extends from one side of the lever arm and is connected to the beam, the function of the spring being to return the lever arm to normal position in which the brake is released or inoperative.

Preferably to the end of the car is fixed a bracket 17 and a curved toothed bar 18 concentric with the bracket. An operating lever 19 is pivoted between its ends to the bracket, as at 20, and has one end formed with a handle 21 and a lateral lug 22 adapted to engage the toothed bar. To the opposite end of this lever is connected, as by a clevis 23, one end of a chain or flexible member 24, said chain taking over a guide roller 25, journaled in a bracket 26 at one corner of the car body, and having its opposite end attached to a sectional rod 27. The sections of this rod are coupled by a turn buckle device 28 and constitutes an adjustable connection between the chain and lever arm 15.

In practice, to apply the brake, downward pressure on the handle 21 will, through the intermediate connections, rock the shaft 6 and lower the brake shoe onto the rail, the guide means serving to always hold the active face of the shoe parallel with the rail. The shoe may be held in engagement with the rail by catching the lug or tooth 22 in the toothed bar 18. To release the brake, this lug 22 is disengaged from the bar 18 and pressure removed from the operating lever 19 whereupon the spring 16 will return the parts to a normally inoperative position.

The brake is very effective and by applying it to the rail the wheels will not be damaged, "flat wheels" will be avoided, and the use of sprags done away with.

What is claimed is:

1. In a mechanism of the character described, a car body, spaced bearings thereon, a rock shaft journaled in the bearings, adjustable arms on the shaft, a brake shoe pivoted to each arm, a guide on the car body, a guide bar fixed to the shoe and slidably engaged with the guide, and means for rocking the shaft.

2. In a mechanism of the character described, a car body, spaced bearings thereon, a rock shaft journaled in the bearings, adjustable arms on the shaft, a brake shoe pivoted to each arm, a guide on the car body, a guide bar fixed to the shoe and slidably engaged with the guide, a lever arm extending upwardly from the shaft alongside of the car body, a spring connecting the lever arm to the body, and means for oscillating the lever arm against the action of the spring.

3. In a mechanism of the character described, a car body, spaced bearings thereon, a rock shaft journaled in the bearings, adjustable arms on the shaft, a brake shoe pivoted to each arm, a guide on the car body, a guide bar fixed to the shoe and slidably engaged with the guide, a lever arm extending upwardly from the shaft alongside of the car body, a spring connecting the lever arm to the body, an operating lever pivoted to the car body, and an adjustable connection between the lever arm and the operating lever.

4. In a car brake, a brake shoe carrier, a rock shaft having a fixed arm pivoted to the shoe carrier, the latter having a cut-out in its side, a bar fixed in the cut-out of the carrier and extending upwardly therefrom, a guide for the bar, a brake shoe fixed to the carrier and abutting the guide bar, and means for imparting rotary movement to the shaft.

In testimony whereof we affix our signatures.

CHARLES CRON.
RICHARD L. DINGLE.

Copies of this patent may be obtained for five cents each, by addressing the "Commissioner of Patents, Washington, D. C."